United States Patent
Chang et al.

(10) Patent No.: US 12,033,613 B2
(45) Date of Patent: Jul. 9, 2024

(54) DEEP NEURAL NETWORK BASED NON-AUTOREGRESSIVE SPEECH SYNTHESIZER METHOD AND SYSTEM USING MULTIPLE DECODER

(71) Applicant: IUCF-HYU (INDUSTRY-UNIVERSITY COOPERATION FOUNDATION HANYANG UNIVERSITY), Seoul (KR)

(72) Inventors: Joon-Hyuk Chang, Seoul (KR); Moa Lee, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 307 days.

(21) Appl. No.: 17/599,793

(22) PCT Filed: Jun. 26, 2020

(86) PCT No.: PCT/KR2020/008330
§ 371 (c)(1),
(2) Date: Sep. 29, 2021

(87) PCT Pub. No.: WO2021/010613
PCT Pub. Date: Jan. 21, 2021

(65) Prior Publication Data
US 2022/0108681 A1 Apr. 7, 2022

(30) Foreign Application Priority Data
Jul. 16, 2019 (KR) .................. 10-2019-0085920

(51) Int. Cl.
G10L 13/047 (2013.01)
G06N 3/08 (2023.01)
G10L 25/30 (2013.01)

(52) U.S. Cl.
CPC .............. G10L 13/047 (2013.01); G06N 3/08 (2013.01); G10L 25/30 (2013.01)

(58) Field of Classification Search
CPC ....... G10L 25/30; G10L 13/047; G10L 13/02; G10L 13/00
See application file for complete search history.

(56) References Cited

U.S. PATENT DOCUMENTS 8,560,312 B2   10/2013   Etter
10,741,169 B1*  8/2020   Trueba .................... G10L 13/10
(Continued)

FOREIGN PATENT DOCUMENTS

EP         2 517 201 B1    11/2015
KR    10-2018-0113325 A    10/2018

OTHER PUBLICATIONS

Arik, Sercan Ö., Heewoo Jun, and Gregory Diamos. "Fast spectrogram inversion using multi-head convolutional neural networks." IEEE Signal Processing Letters 26, No. 1 (2018): 94-98. (Year: 2018).*

(Continued)

Primary Examiner — Mark Villena
(74) Attorney, Agent, or Firm — Sughrue Mion, PLLC (57) ABSTRACT

Proposed are a deep neural network-based non-autoregressive voice synthesizing method and a system therefor. A deep neural network-based non-autoregressive voice synthesizing system according to an embodiment may comprise: a voice feature vector column synthesizing unit which constitutes a non-recursive deep neural network based on multiple decoders, and gradually produces a voice feature (Continued)

vector column through the multiple decoders from a template including temporal information of a voice; and a voice reconstituting unit which transforms the voice feature vector column into voice data, wherein the voice feature vector column synthesizing unit produces a template input, and produces a voice feature vector column by adding, to the template input, sentence data refined through an attention mechanism.

11 Claims, 6 Drawing Sheets

(56) References Cited

U.S. PATENT DOCUMENTS

| | | | |
|---|---|---|---|
| 2005/0144003 A1* | 6/2005 | Iso-Sipila | G10L 13/08 |
| | | | 704/E13.012 |
| 2017/0345433 A1 | 11/2017 | Dittmar et al. | |
| 2018/0336880 A1* | 11/2018 | Arik | G10L 25/30 |
| 2019/0180732 A1 | 6/2019 | Ping et al. | |
| 2019/0251952 A1* | 8/2019 | Arik | G10L 13/08 |
| 2019/0272818 A1* | 9/2019 | Fernandez | G10L 13/10 |
| 2020/0394994 A1* | 12/2020 | Prenger | G06N 3/045 |
| 2022/0351714 A1* | 11/2022 | Yang | G10L 13/047 |

OTHER PUBLICATIONS

Naihan Li et al., "Neural Speech Synthesis with Transformer Network", The Thirty-Third AAAI Conference on Artificial Intelligence (AAAI-19), 2019, pp. 6706-6713.

International Search Report for PCT/KR2020/008330, dated Sep. 21, 2020 (PCT/ISA/210).

* cited by examiner

DEEP NEURAL NETWORK BASED NON-AUTOREGRESSIVE SPEECH SYNTHESIZER METHOD AND SYSTEM USING MULTIPLE DECODER

CROSS REFERENCE TO RELATED APPLICATIONS

This application is a National Stage of International Application No. PCT/KR2020/008330 filed Jun. 26, 2020, claiming priority based on Korean Patent Application No. 10-2019-0085920 filed Jul. 16, 2019.

TECHNICAL FIELD

Embodiments of the present disclosure relate to a deep neural network-based non-autoregressive speech synthesis method and system using multiple decoders, and more particularly, to a speech synthesis model generation method and system for constructing a non-regressive deep neural network based on multiple decoders and generating a speech feature vector from an input containing temporal information of speech. The present disclosure is research resourced by the government (Ministry of Science and ICT (MSIT)) in 2017 and carried out with the support of Institute for Information and Communications Technology Promotion of (No. 2017-0-00474, Development of Technology of Intelligent Signal Processing for AI Speaker Voice Guardian).

BACKGROUND ART

A deep neural network (DNN)-based speech synthesis technology is a technology for generating speech data from character data by using a DNN. In general, a character data analysis unit for analyzing character data and a speech feature vector sequence synthesis unit for generating a speech feature vector are configured as one network.

The sentence data analysis unit, that is, the first step, is divided into a sentence data (character embedding) part for splitting sentence data into alphabets and converting the split alphabets into a vector sequence valid for an input to a neural network and a part for purifying, from the embedded vector sequence, information necessary to generate a speech feature vector through a network consisting of a convolution neural network and a recurrent neural network.

The speech feature vector sequence synthesis unit, that is, the second step, is divided into two steps. In the first step, after information suitable for speech data is selectively collected from the purified sentence data vector sequence through attention mechanisms, the recurrent neural network generates a Mel-filterbank speech feature vector based on the collected information. In this case, an input to the recurrent neural network is Mel-filterbank speech data, that is, the output of the previous step, which is configured as an input in an autoregressive manner. In the second step, the Mel-filterbank speech data is mapped to a log-power spectrogram.

In general, quality of speech synthesis is measured using a mean opinion score (M.O.S), that is, a subjective evaluation method. In the case of some vocoder models, a degree of distortion of speech is measured. In the case of a DNN-based end-to-end model, only the M.O.S is used.

A DNN-based end-to-end speech synthesis technology refers to a technology in which one DNN model generates a spectrogram-based speech feature or speech signal by analyzing sentence data. Sentence data and speech data have different sampling rates. In order to solve such a problem, a sequence-to-sequence (seq2seq) network and attention mechanisms are used. The seq2seq network includes an encoder and a decoder. The encoder plays a role to purify sentence data. The decoder generates a spectrogram-based speech feature based on information purified by the encoder. The decoder sequentially generates an output based on an autoregressive flow in which a generated output becomes an input in a next time. However, the autoregressive flow enables efficient delivery of information, but has a disadvantage in that it has a low speed because outputs need to be sequentially generated in a time order.

As described above, in the existing neural network-based speech synthesis technology, a speech feature vector is synthesized in a way to use, as an input for a current step again, a Mel-filterbank speech feature vector generated in a previous step, in the autoregressive manner. In a learning step, it is not necessary to wait for an output from a previous step because an input is configured using a method of shifting and using an already given target speech feature vector sequence. However, the existing neural network-based speech synthesis technology has a disadvantage in that in a test step, a generation speed is slow because an output needs to be generated in stages.

In the case of the autoregressive speech synthesis model, since an output is used as an input again, a phenomenon in which the sound magnitude of speech is reduced toward the rear side due to a characteristic of the recurrent neural network is frequent. Furthermore, there is a need for a structure for separately finding out the end of speech upon generation of speech. There occurs a phenomenon in which the generation of speech is halfway stopped if an end part is not properly found.

DISCLOSURE

Technical Problem

Embodiments of the present disclosure describe a DNN-based non-autoregressive speech synthesis method and system, and more specifically, provide a speech synthesis model generation technology for estimating the length of a speech feature vector and generating non-regressively a speech vector by generating a bin input.

Embodiments of the present disclosure may provide a DNN-based non-autoregressive speech synthesis method and system, which can remove an autoregressive flow of the existing autoregressive speech synthesis technology, can construct a new input called a template, and can generate a speech by using, even in a test step, the same method as that in a learning step in order to solve a problem with the existing autoregressive speech synthesis technology.

An object of the present disclosure is to provide a method capable of solving, by using a new input called a template, a problem in that a speech synthesis model must generate a speech feature vector in stages.

However, a template is an input including only temporal information of speech in a bin input. Unlike estimating a Mel-filterbank speech feature in a current step from a Mel-filterbank speech feature generated in a previous step by using the existing autoregressive method, estimating a Mel-filterbank speech feature from a template has limitations if only the existing speech synthesis method is used because input and output domains have a great difference. An object of the present disclosure is to provide a method capable of solving a problem in that sound quality is greatly degraded in a non-autoregressive method by implementing a speech synthesis model to generate a speech feature vector from a template in stages through multiple decoders.

TECHNICAL SOLUTION

A deep neural network (DNN)-based non-autoregressive speech synthesis system according to an embodiment includes a speech feature vector sequence synthesis unit configured to construct a non-regressive deep neural network based on multiple decoders and generate a speech feature vector sequence from a template including temporal information of speech in stages through the multiple decoders, and a speech reconstruction unit configured to convert the speech feature vector sequence into speech data. The speech feature vector sequence synthesis unit may generate an input of the template and generates a speech feature vector sequence by adding purified sentence data to the generated input of the template through attention mechanisms.

The system further includes a sentence data analysis unit configured to analyze sentence data and output the purified sentence data. The sentence data analysis unit may generate an alphabet unit input by decomposing the sentence data in a Hanguel alphabet unit, may form embedded sentence data having a sentence feature vector sequence form by embedding the alphabet unit input, and may form the purified sentence data by purifying the embedded sentence data by using convolution artificial neural networks.

The sentence data analysis unit may generate the alphabet unit input by decomposing the sentence data in the Hanguel alphabet unit, may index the alphabet unit input and map the indexed input to number data, may one-hot encode the number data, and may generate the embedded sentence data including a vector sequence having a continuous characteristic by multiplying the one-hot embedded vector sequence and a sentence embedding matrix.

The speech feature vector sequence synthesis unit may generate an input of the template, may generate an encoded template by adding the purified sentence data to the input of the template by using the attention mechanisms, may synthesize a Mel-filterbank speech feature vector sequence by decoding the encoded template, and may synthesize a log-power spectrum speech feature vector sequence from the Mel-filterbank speech feature vector sequence.

The speech feature vector sequence synthesis unit may receive the purified sentence data and the template as inputs, may select a portion necessary for log-power spectrum synthesis through the attention mechanisms and forms a vector having a fixed length, may estimate a log-power spectrum from the template in stages through multiple decoders, and may encode template data including accurate information by repeating a convolution network and the attention mechanisms through at least any single decoder of the multiple decoders.

The speech reconstruction unit may generate phase information from the speech feature vector sequence having magnitude information by using a Griffin-lim algorithm, and may convert the phase information into the speech data.

A deep neural network (DNN)-based non-autoregressive speech synthesis method according to another embodiment includes a speech feature vector sequence synthesis step of constructing a non-regressive deep neural network based on multiple decoders and generate a speech feature vector sequence from a template including temporal information of speech in stages through the multiple decoders, and a speech reconstruction step of converting the speech feature vector sequence into speech data. The speech feature vector sequence synthesis unit may generate an input of the template and generates a speech feature vector sequence by adding purified sentence data to the generated input of the template through attention mechanisms.

The method further includes a sentence data analysis step of analyzing sentence data and outputting the purified sentence data. The sentence data analysis step may include steps of generating an alphabet unit input by decomposing the sentence data in a Hanguel alphabet unit and forming embedded sentence data having a sentence feature vector sequence form by embedding the alphabet unit input, and forming the purified sentence data by purifying the embedded sentence data by using convolution artificial neural networks.

The step of forming the embedded sentence data having the sentence feature vector sequence form may include steps of generating the alphabet unit input by decomposing the sentence data in the Hanguel alphabet unit, indexing the alphabet unit input and mapping the indexed input to number data, one-hot encoding the number data, and generating the embedded sentence data including a vector sequence having a continuous characteristic by multiplying the one-hot embedded vector sequence and a sentence embedding matrix.

In this case, the template, that is, an input to the speech feature vector sequence synthesis unit, may include absolute positional encoding data and relative positional encoding data.

The speech feature vector sequence synthesis step may include a step of generating an input of the template, a speech data encoding step of generating an encoded template by adding the purified sentence data to the input of the template by using the attention mechanisms, a speech data decoding step of synthesizing a Mel-filterbank speech feature vector sequence by decoding the encoded template, and a step of synthesizing a log-power spectrum speech feature vector sequence from the Mel-filterbank speech feature vector sequence.

Furthermore, the step of generating the input of the template may include steps of generating absolute positional encoding data, generating relative positional encoding data, and of generating the template by concatenating the generated absolute positional encoding data and the relative positional encoding data.

The speech data encoding step may include steps of receiving the purified sentence data and the template as inputs, selecting a portion necessary for log-power spectrum synthesis through the attention mechanisms, and forming a vector having a fixed length, estimating a log-power spectrum from the template in stages through multiple decoders, and encoding template data including accurate information by repeating a convolution network and the attention mechanisms through at least any single decoder of the multiple decoders.

The speech data decoding step may include a step of synthesizing the Mel-filterbank speech feature vector sequence from the encoded template through a speech data decoding artificial neural network.

The speech reconstruction step may include generating phase information from the speech feature vector sequence having magnitude information by using a Griffin-lim algorithm, and converting the phase information into the speech data.

Advantageous Effects

According to embodiments of the present disclosure, there can be provided the DNN-based non-autoregressive speech synthesis method and system, which can synthesize a speech at a high speed compared to the autoregressive speech synthesis method because a speech feature vector sequence is synthesized at a time in a non-autoregressive manner.

Furthermore, according to embodiments of the present disclosure, there is an advantage in that the magnitude of speech can be constantly maintained in the entire sentence because a phenomenon in which the magnitude of an output is gradually decreased does not occur in the autoregressive-based model regression model.

Furthermore, according to embodiments of the present disclosure, a speech can be synthesized at a high speed compared to the existing autoregressive method because a speech feature vector is not sequentially generated for each frame, but the speech feature vectors of all frames are synthesized at a time in a non-autoregressive manner.

BEST MODE FOR INVENTION

Hereinafter, embodiments of the present disclosure are described with reference to the accompanying drawings. However, the described embodiments may be modified in various other forms, and the scope of the present disclosure is not restricted by the following embodiments. Furthermore, various embodiments are provided to more fully describe the present disclosure to a person having average knowledge in the art. The shapes, sizes, etc. of elements in the drawings may be exaggerated for a clear description.

The following embodiments of the present disclosure relate to a deep neural network (DNN)-based non-autoregressive speech synthesis method and system for estimating the length of a speech feature vector and non-regressively generating a speech vector by generating a bin input. According to embodiments, a speech can be generated even in a test step by using the same method as that in a learning step by removing an autoregressive flow of the existing autoregressive speech synthesis system and constructing a new input called a template.

According to embodiments, a speech can be synthesized at a high speed compared to an autoregressive speech synthesis method by synthesizing a speech feature vector sequence at a time in a non-autoregressive manner.

Figure 1:
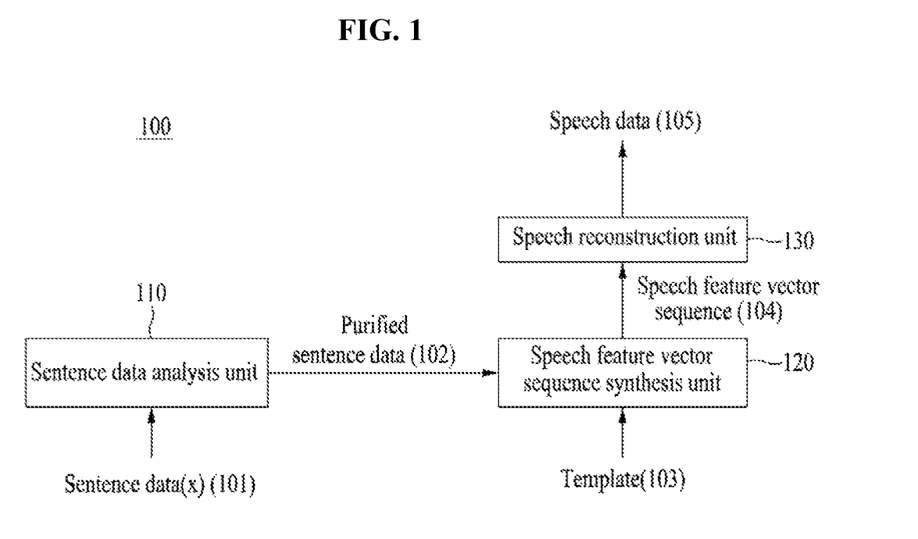
FIG. 1 is a diagram illustrating an overall configuration of a non-autoregressive speech synthesis system according to an embodiment.

FIG. 1 is a diagram illustrating an overall configuration of a non-autoregressive speech synthesis system according to an embodiment.

Referring to FIG. 1, a deep neural network (DNN)-based non-autoregressive speech synthesis system 100 according to an embodiment may include a sentence data analysis unit 110 for analyzing sentence data 101, a speech feature vector sequence synthesis unit 120 for synthesizing a speech feature vector sequence 104, and a speech reconstruction unit 130 for converting the speech feature vector sequence 104 into a speech.

The sentence data analysis unit 110 may analyze the sentence data 101 and output purified sentence data 102. The sentence data analysis unit 110 may be divided into a sentence data embedding part for changing, into an input to the DNN, character input data received in a Hanguel alphabet unit and an artificial neural network part for purifying the embedded data. More specifically, the sentence data embedding part may generate an alphabet unit input by decomposing the sentence data 101 in a Hanguel alphabet unit, may form embedded sentence data having a sentence feature vector sequence form by embedding the alphabet unit, and may form the purified sentence data 102 by purifying the embedded sentence data by using convolution artificial neural networks through the artificial neural network part.

In particular, the sentence data analysis unit 110 may generate an alphabet unit input by decomposing the sentence data 101 in a Hanguel alphabet unit, may index the alphabet unit input, may map the alphabet unit input to number data, may one-hot encode the number data, and may generate embedded sentence data including a vector sequence having a continuous characteristic by multiplying the one-hot embedded vector sequence and a sentence embedding matrix.

The speech feature vector sequence synthesis unit 120 may construct a multi-decoder-based non-regressive DNN, and may generate the speech feature vector sequence 104 from a template 103 including temporal information of speech in stages through multiple decoders. More specifically, the speech feature vector sequence synthesis unit 120 may generate an input of the template, and may generate the speech feature vector sequence 104 by adding the purified sentence data 102 to the generated template 103 by using attention mechanisms. In this case, the template 103, that is, an input to the speech feature vector sequence synthesis unit 120, may include absolute positional encoding data and relative positional encoding data.

Furthermore, the speech feature vector sequence synthesis unit 120 may include a speech data encoding unit and a speech data decoding unit.

The speech feature vector sequence synthesis unit 120 may generate the input of the template 103, and may generate the encoded template by adding the purified sentence data 102 to the input of the template by using the attention mechanisms through the speech data encoding unit. Thereafter, the speech data decoding unit may synthesize a Mel-filterbank speech feature vector sequence by decoding the encoded template. Furthermore, the speech feature vector sequence synthesis unit 120 may synthesize a log-power spectrum speech feature vector sequence from the Mel-filterbank speech feature vector sequence.

The speech feature vector sequence synthesis unit 120 may receive the purified sentence data 102 and the template 103 as inputs, may select a portion necessary for log-power spectrum synthesis through the attention mechanisms, and may form a vector having a fixed length. Thereafter, the speech feature vector sequence synthesis unit 120 may estimate a log-power spectrum from the template 103 in stages through the multiple decoders, and may encode data of the template 103, including accurate information, by repeating a convolution network and the attention mechanisms through at least any single decoder of the multiple decoders.

The speech reconstruction unit 130 may convert the speech feature vector sequence 104 into speech data 105.

More specifically, the speech reconstruction unit 130 may generate phase information from the speech feature vector sequence 104 having magnitude information by using a Griffin-lim algorithm, and may convert the phase information into the speech data 105.

Figure 2:
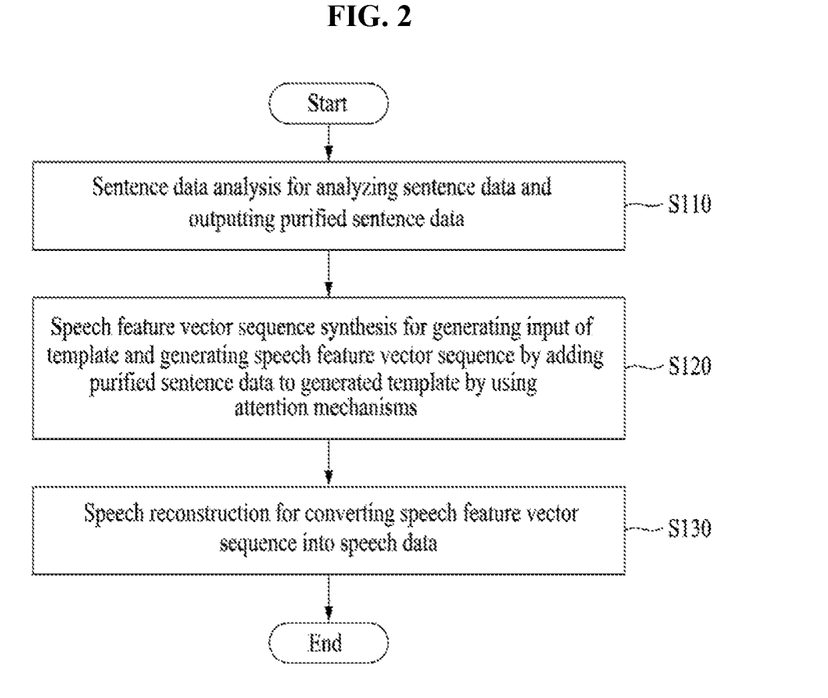
FIGS. 2 to 4 are flowcharts illustrating a non-autoregressive speech synthesis method according to an embodiment.
Figure 3:
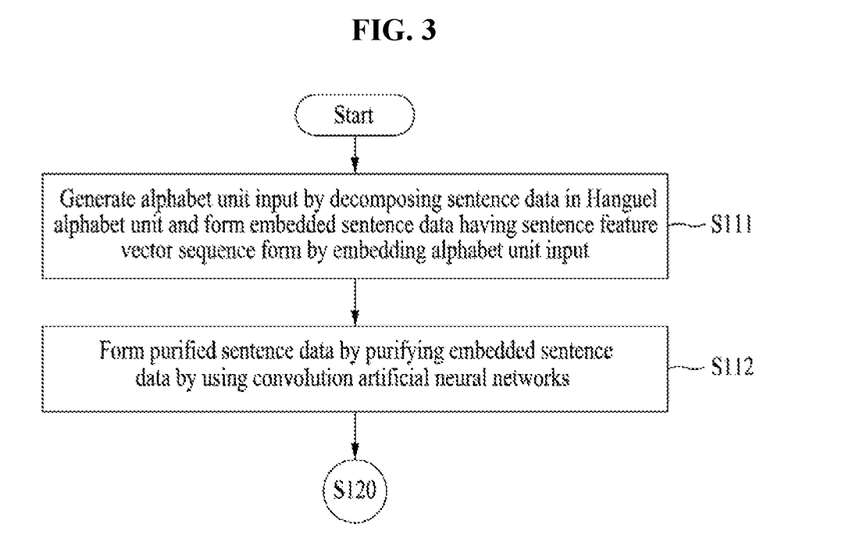
Figure 4:
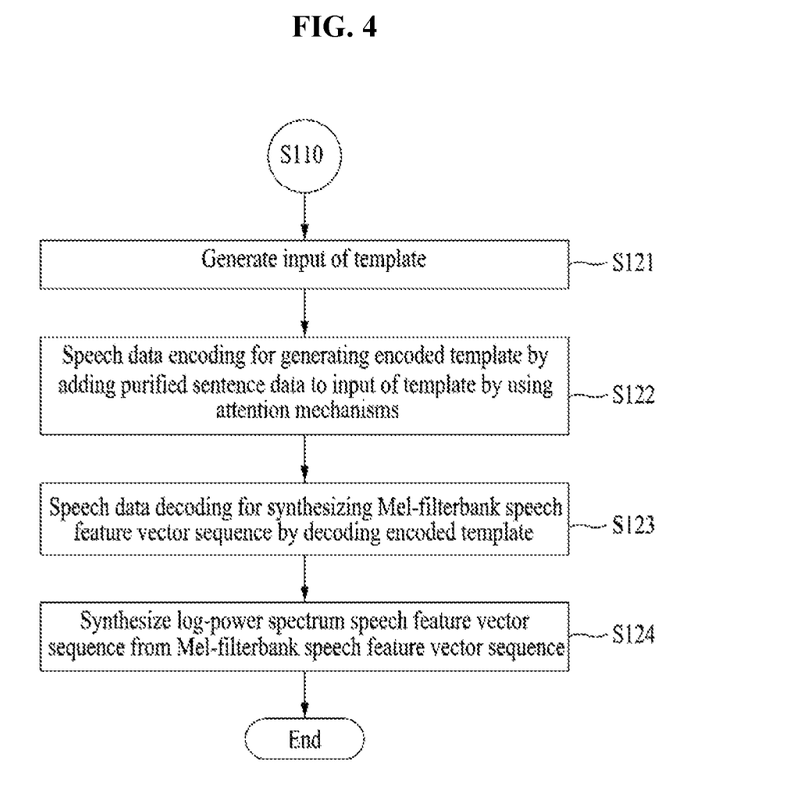

FIGS. 2 to 4 are flowcharts illustrating a non-autoregressive speech synthesis method according to an embodiment.

Referring to FIG. 2, a deep neural network (DNN)-based non-autoregressive speech synthesis method according to an embodiment may include a sentence data analysis step S110 of analyzing sentence data and outputting purified sentence data, a speech feature vector sequence synthesis step S120 of constructing a multi-decoder-based non-regressive DNN and generating a speech feature vector sequence from a template including temporal information of speech in stages through multiple decoders, and a speech reconstruction step S130 of converting the speech feature vector sequence into speech data.

Referring to FIG. 3, the sentence data analysis step S110 may include step S111 of generating an alphabet unit input by decomposing sentence data in a Hanguel alphabet unit and forming embedded sentence data having a sentence feature vector sequence form by embedding the alphabet unit input, and step S112 of forming purified sentence data by purifying the embedded sentence data by using convolution artificial neural networks.

Referring to FIG. 4, the speech feature vector sequence synthesis step S120 may include step S121 of generating an input of a template, a speech data encoding step S122 of generating an encoded template by adding purified sentence data to the input of the template by using the attention mechanisms, a the speech data decoding step S123 of synthesizing a Mel-filterbank speech feature vector sequence by decoding the encoded template, and step S124 of synthesizing a log-power spectrum speech feature vector sequence from the Mel-filterbank speech feature vector sequence.

The steps of the non-autoregressive speech synthesis method according to an embodiment are more specifically described below.

The DNN-based non-autoregressive speech synthesis method according to an embodiment may be more specifically described by taking, as an example, the DNN-based non-autoregressive speech synthesis system according to an embodiment described with reference to FIG. 1. In this case, the DNN-based non-autoregressive speech synthesis system according to an embodiment may include the sentence data analysis unit, the speech feature vector sequence synthesis unit and the speech reconstruction unit.

In the sentence data analysis step S110, the sentence data analysis unit may analyze sentence data and output purified sentence data. In this case, the sentence data analysis step S110 may generate the purified sentence data by purifying the sentence data by using one artificial neural network. In this case, the artificial neural network may be called a sentence data purification artificial neural network, and may be trained.

The sentence data analysis step S110 may include step S111 of generating an alphabet unit input by decomposing the sentence data in a Hanguel alphabet unit and forming embedded sentence data having a sentence feature vector sequence form by embedding the alphabet unit input and step S112 of forming the purified sentence data by purifying the embedded sentence data by using convolution artificial neural networks. In this case, the embedding is a process for converting discontinuous symbol data, such as a sentence, into feature vectors that are continuous and have various characteristics.

Step S111 of forming the embedded sentence data may include a step (sentence decomposition step) of generating the alphabet unit input by decomposing the sentence data in the Hanguel alphabet unit, a step (indexing step) of indexing the alphabet unit input and mapping the indexed input to number data, a step of one-hot encoding the number data, and a step (feature vector conversion step) of generating the embedded sentence data including a vector sequence having a continuous characteristic by multiplying the one-hot embedded vector sequence and a sentence embedding matrix.

The sentence decomposition step is a step of splitting a Hanguel sentence into alphabets. The indexing step is a step of numbering the split alphabets. In this case, an index table in which numbers correspond to respective alphabets in a one-to-one way is configured. The numbers are assigned to the alphabets according to the index table. When the two steps are performed, the sentence data is converted into the number data. The generated sentence feature vector sequence (i.e., the embedded sentence data) may be represented as in the following equation.

$$x=[\vec{x}_1, \vec{x}_2 \ldots \vec{x}_j \ldots \vec{x}_n]\quad\text{[Equation 1]}$$

In the feature vector conversion step, after the generated number data is one-hot encoded, a generated one-hot vector ($x_i$) may be converted into a feature vector by multiplying the generated one-hot vector by an embedding matrix "e" as in Equation 2. Accordingly, the embedded sentence data including the vector sequence may be generated.

$$x_j = e_x * \vec{x}_j \quad\text{[Equation 2]}$$

In the speech feature vector sequence synthesis step S120, the speech feature vector sequence synthesis unit may construct a multi-decoder-based non-regressive DNN, and may generate the speech feature vector sequence from the template including temporal information of speech in stages through multiple decoders. More specifically, the speech feature vector sequence synthesis unit may generate the input of the template, and may generate the speech feature vector sequence by adding the purified sentence data to the generated template by using the attention mechanisms.

The speech feature vector sequence synthesis step S120 may include step S121 of generating the input of the template, the speech data encoding step S122 of generating the encoded template by adding the purified sentence data to the input of the template by using the attention mechanisms, the speech data decoding step S123 of synthesizing the Mel-filterbank speech feature vector sequence by decoding the encoded template, and step S124 of synthesizing the log-power spectrum speech feature vector sequence from the Mel-filterbank speech feature vector sequence.

Furthermore, step S121 of generating the input of the template may include a step of generating absolute positional encoding data, step of generating relative positional encoding data, and step of generating a template by concatenating the generated absolute positional encoding data and the relative positional encoding data.

Furthermore, the speech data encoding step S122 may include a step of receiving the purified sentence data and the template as inputs, selecting a portion necessary for log-power spectrum synthesis through the attention mechanisms, and forming a vector having a fixed length, a step of receiving the purified sentence data and the template as inputs, selecting a portion necessary for log-power spectrum synthesis through the attention mechanisms, and forming a vector having a fixed length, a step of estimating a log-power spectrum from the template in stages through the multiple decoders, and a step of encoding template data including accurate information by repeating the convolution network and the attention mechanisms through at least any single decoder of the multiple decoders. In this case, a speech data encoding artificial neural network may be trained. The speech data encoding artificial neural network may become the convolution artificial neural networks.

Furthermore, the speech data decoding step S123 may include a step of synthesizing the Mel-filterbank speech feature vector sequence from the encoded template by using a speech data decoding artificial neural network. In this case, the speech data decoding artificial neural network may be trained.

As described above, the speech feature vector sequence synthesis unit corresponds to the encoder of all models. A template (or template data), that is, an input to the speech feature vector sequence synthesis unit, may include relative positional encoding (data) and absolute positional encoding (data). Each positional encoding may have the same dimension as the Mel-filterbank speech feature vector sequence. That is, each positional encoding datum is a matrix having a magnitude of [time, frequency bin]. A configuration of the absolute positional encoding may be represented as in the following equation.

$$PE_{(pos,2i)} = \sin(pos/10000^{2i/d_{model}})$$

$$PE_{(pos,2i+1)} = \cos(pos/10000^{2i/d_{model}}) \quad \text{[Equation 3]}$$

The absolute positional encoding may have a sin and cos waveform having three parameters of pos, i, and $d_{model}$. In this case, "pos" is a natural number that increases from 1 in a time order within data. "i" is a natural number that increases from 1 in order of frequency bins within data. "$d_{model}$" is 80 that is identical with the number of frequency bins of a Mel-filterbank.

A sin wave and a cos wave which are changed over time and are not redundant add time information to data, and help a convolution neural network whose training of order information is limited to incorporate order and time information into results, unlike a recurrent neural network.

A configuration of the relative positional encoding may be represented as in the following equation.

$$PE_{(pos,2i)} = \sin(pos/10000^{2i/speech\_len})$$

$$PE_{(pos,2i+1)} = \cos(pos/10000^{2i/speech\_len}) \quad \text{[Equation 4]}$$

The relative positional encoding is similar to the absolute positional encoding, but may include a parameter speech_len, that is, the length of all speech data instead of the parameter $d_{model}$. Since the parameter speech_len is included in the configuration of the positional encoding, relative time information of the entire length may be represented unlike the configuration of the absolute positional encoding.

The two positional encoding are concatenated to constitute a template. Accordingly, the entire template is a matrix having a magnitude of [time, frequency bin*2].

Figure 5:
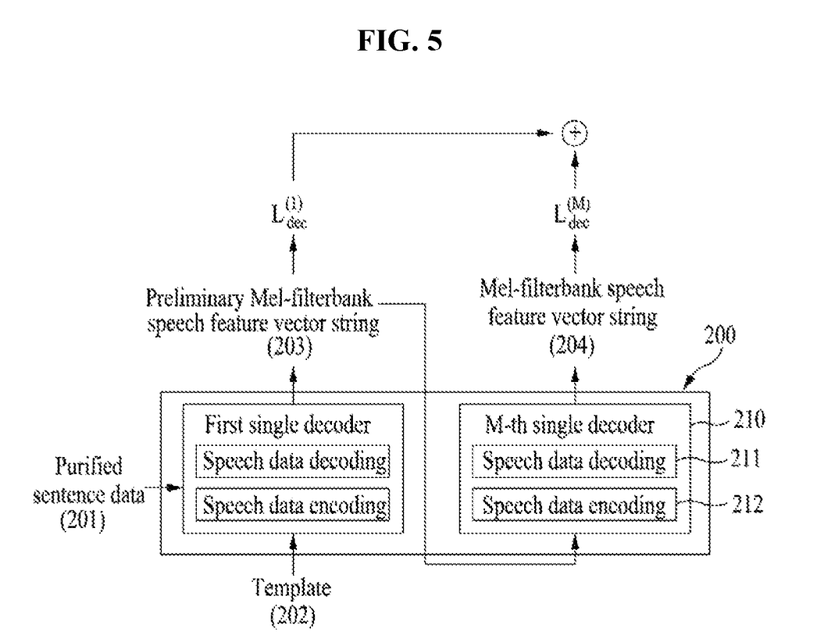
FIG. 5 is a diagram for describing a process of generating a Mel-filterbank speech feature vector sequence according to an embodiment.

FIG. 5 is a diagram for describing a process of generating a Mel-filterbank speech feature vector sequence according to an embodiment.

From FIG. 5, a process of generating a Mel-filterbank speech feature vector sequence 204 through a speech feature vector sequence synthesis unit of the DNN-based speech synthesis system may be seen.

The speech feature vector sequence synthesis unit 200 corresponds to the decoder of all models, and may include a speech data encoding unit 212 and a speech data decoding unit 211. The speech data encoding unit 212 may include multiple convolution networks and attention mechanisms. While experiencing the attention mechanisms, a template 202 may be encoded into new information that properly contains sentence information for generating the Mel-filterbank speech feature vector sequence 204.

In general, there is a difference between sampling rates of a speech feature vector sequence and sentence data. In general, the sampling rate of the speech feature vector sequence is much greater than that of the sentence data. When information on the sentence data is added to the template 202, there is a problem relating to which sentence data will be added to the template 202 per hour due to such a difference between the sampling rates. The attention mechanism has shown an effect in solving such a problem in a common autoregressive speech synthesis system. In the present disclosure, purified sentence data 201 is properly added to the template 202 by using an attention mechanism 210.

However, the Mel-filterbank speech feature vector sequence 204, that is, an input to an autoregressive model, includes sentence information and speech information in a previous time. In contrast, the template 202 includes only time information. Accordingly, in order to solve insufficient information of the template 202, the present disclosure may propose learning by which accuracy is gradually increased through multiple decoders 210 as in the structure of FIG. 5. The multiple decoders 210 have a structure including several decoders 210 having the same structure, and have a structure in which the output of the decoder 210 in a previous step is inputted as an input to the decoder 210 in a next step. In this case, each of the decoders 210 may estimate Mel-filterbank feature vectors 203 and 204 of speech. The following equation represents an objective function of a single decoder 210.

$$L_{dec} = E[|Y_{true} - Y_{pred}|] \quad \text{[Equation 5]}$$

Through such a structure, an input to which more information from the template 202 including only temporal information has been added enters the input of each decoder 210. In this case, since a load added to one decoder 210 is distributed to the multiple decoders 210, this improves learning efficiency of each decoder 210 and help to generate a Mel-filterbank speech feature vector having generally high accuracy. Furthermore, the speech feature vector sequence synthesis unit including the multiple decoders 210 may be trained through one objective function.

The following equation represents an objective function of the multiple decoders 210 using M decoders 210.

$$L = \frac{1}{M} \sum_{m=1}^{M} L_{dec}^{(m)} \quad \text{[Equation 6]}$$

Furthermore, each decoder 210 may properly add purified sentence data information to the data of the template 202 by using a total of three attention mechanisms and convolution networks.

Figure 6:
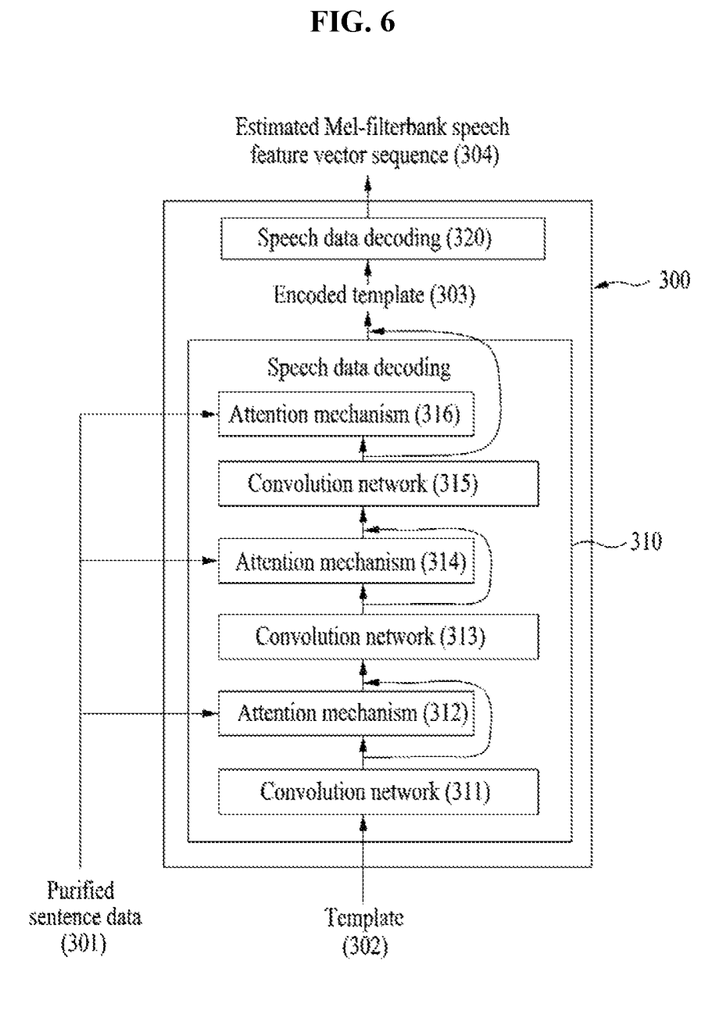
FIG. 6 is a diagram for describing a process of adding, by a single decoder, purified sentence data information to template data according to an embodiment.

FIG. 6 is a diagram for describing a process of adding, by a single decoder, purified sentence data information to template data according to an embodiment.

FIG. 6 illustrates a process of properly adding, by a single decoder, purified sentence data information to the data of a template 302 by repeating attention mechanisms 312, 314, and 316 and convolution networks 311, 313, and 315. As described above, a speech feature vector sequence synthesis unit 300 corresponds to the decoder of all models, and may include a speech data encoding unit 310 and a speech data decoding unit 320. The speech data encoding unit 310 may include the multiple convolution networks 311, 313, and 315 and the multiple attention mechanisms 312, 314, and 316. While experiencing the attention mechanisms 312, 314, and 316, the template 302 may be encoded into new information properly including sentence information for generating a Mel-filterbank speech feature vector sequence 304.

After experiencing the speech data encoding unit 220, the template 302 is mapped to an encoded template 303 including sentence information for synthesizing the Mel-filterbank speech feature vector sequence 304. A process of each of the attention mechanisms 312, 314, and 316 is as follows.

First, the purified sentence data 301 is separated into a matrix V and a matrix K. In this case, the matrices V and K have the same dimension of [character time, channel]. A template that has experienced the convolution networks 311, 313, and 315 is called a matrix Q, and a magnitude thereof is [speech time, channel]. In this case, sentence data and speech data have the same channel value.

$$E = QK^T \qquad \text{[Equation 7]}$$

Equation 7 is an equation about a method of calculating a degree that two inputs are matched in the attention mechanisms 312, 314, and 316. E, that is, a matrix indicating the degree that the two matrices are matched, is calculated as a scalar product of Q and K. In this case, the magnitude of the matrix E is [speech time, sentence time]. An element of the matrix E may be represented as $e_{ij}$.

$$\alpha_{ij} = \frac{\exp(e_{ij})}{\sum_{k=1}^{n} \exp(e_{ik})} \qquad \text{[Equation 8]}$$

Equation 8 may convert data of the matrix E into cc having a meaning of a probability by using a softmax function. A matrix composed of cc is indicated as A, and is called an alignment matrix. A process of calculating a matrix C, that is, the final results of the attention mechanism 210 may be represented as in the following equation.

$$C = AV \qquad \text{[Equation 9]}$$

The matrix C contains information on sentence data and is called context data. The matrix C has the same dimension [speech time, channel] as the matrix Q, and thus the matrices Q and C may be concatenated and used as a next input to a network.

The attention mechanisms 312, 314, and 316 are applied a total of three times, and may sequentially form more accurate alignment matrices. The encoded template 303 through the above process may be mapped to the Mel-filterbank speech feature vector sequence 304 through the speech data decoding unit 320.

The Mel-filterbank speech feature vector sequence 304 synthesized through the above process may be mapped to a log-power spectrum speech feature vector sequence through a post-processing artificial neural network. An artificial neural network used in the sentence data analysis unit and the speech feature vector sequence synthesis unit may be trained based on an error between two synthesized feature vector sequence and real speech feature vector data. That is, a speech feature vector sequence synthesis artificial neural network may be trained.

In the speech reconstruction step S130, the speech reconstruction unit may convert a speech feature vector sequence into speech data.

The speech reconstruction unit may recover speech data by using the log-power spectrum speech feature vector sequence finally synthesized in a previous step. The log-power spectrum speech feature vector sequence synthesized by the DNN has only magnitude information without phase information. Accordingly, new phase information needs to be generated and constructed using the Griffin-lim algorithm.

According to embodiments, speech can be synthesized at a high speed compared to the autoregressive speech synthesis method because a speech feature vector sequence is synthesized at a time in a non-autoregressive manner. Furthermore, the magnitude of speech can be constantly maintained in the entire sentence because a phenomenon in which the magnitude of an output is gradually decreased does not occur in the autoregressive-based model regression model.

Furthermore, according to embodiments, a problem in that sound quality is greatly degraded in a non-autoregressive method can be solved because the speech synthesis model is implemented to generate a speech feature vector from a template in stages through the multiple decoders.

The aforementioned apparatus may be implemented by a hardware component, a software component or a combination of a hardware component and a software component. For example, the apparatus and component described in the embodiments may be implemented using a processor, a controller, an arithmetic logic unit (ALU), a digital signal processor, a microcomputer, a field programmable gate array (FPGA), a programmable logic unit (PLU), a microprocessor or one or more general-purpose computers or special-purpose computers, such as any other apparatus capable of executing or responding to an instruction. The processing apparatus may perform an operating system (OS) and one or more software applications executed on the OS. Furthermore, the processing apparatus may access, store, manipulate, process and generate data in response to the execution of software. For convenience of understanding, one processing apparatus has been illustrated as being used, but a person having ordinary skill in the art may understand that the processing apparatus may include a plurality of processing elements and/or a plurality of types of processing elements. For example, the processing apparatus may include a plurality of processors or a single processor and a single controller. Furthermore, a different processing configuration, such as a parallel processor, is also possible.

Software may include a computer program, a code, an instruction or a combination of one or more of them and may configure a processing apparatus so that the processing apparatus operates as desired or may instruct the processing apparatuses independently or collectively. The software and/or the data may be embodied in any type of machine, a component, a physical apparatus, a computer storage medium or an apparatus in order to be interpreted by the processor or to provide an instruction or data to the processing apparatus. The software may be distributed to computer systems connected over a network and may be stored or executed in a distributed manner. The software and the data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure alone or in combination. The program instruction stored in the medium may be specially designed and constructed for an embodiment, or may be known and available to those skilled in the computer software field. Examples of the computer-readable medium include magnetic media such as a hard disk, a floppy disk and a magnetic tape, optical media such as a CD-ROM and a DVD, magneto-optical media such as a floptical disk, and hardware apparatuses specially configured to store and execute a program instruction, such as a ROM, a RAM, and a flash memory. Examples of the program instruction include not only machine language code produced by a compiler, but a high-level language code which may be executed by a computer using an interpreter, etc.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, apparatus, and circuit, are coupled or combined in a form different from that of the described method or replaced or substituted with other elements or equivalents.

Accordingly, other implementations, other embodiments, and the equivalents of the claims fall within the scope of the claims.

The invention claimed is:

1. A system for deep neural network-based non-autoregressive speech synthesis, the system comprising:
   a speech feature vector sequence synthesis unit configured to:
   construct a non-regressive deep neural network based on multiple decoders, and
   generate a speech feature vector sequence from a template comprising temporal information of speech in stages through the multiple decoders; and
   a speech reconstruction unit configured to convert the speech feature vector sequence into speech data,
   wherein the speech feature vector sequence synthesis unit is further configured to:
   generate an input of the template,
   generate an encoded template by adding a purified sentence data to the input of the template by using attention mechanisms,
   synthesize a Mel-filterbank speech feature vector sequence by decoding the encoded template, and
   synthesize a log-power spectrum speech feature vector sequence from the Mel-filterbank speech feature vector sequence, and
   wherein the speech feature vector sequence synthesis unit, in order to generate the encoded template, is further configured to:
   receive the purified sentence data and the template as inputs,
   select a portion necessary for log-power spectrum synthesis through the attention mechanisms and forms a vector having a fixed length,
   estimate a log-power spectrum from the template in stages through the multiple decoders, and
   encode data of the template comprising accurate information by repeating a convolution network and the attention mechanisms through at least any single decoder of the multiple decoders.

2. The system of claim 1, further comprising a sentence data analysis unit configured to analyze sentence data and output the purified sentence data,
   wherein the sentence data analysis unit is further configured to:
   generate an alphabet unit input by decomposing the sentence data in a Hanguel alphabet unit,
   form embedded sentence data having a sentence feature vector sequence form by embedding the alphabet unit input, and
   form the purified sentence data by purifying the embedded sentence data by using convolution artificial neural networks.

3. The system of claim 2, wherein the sentence data analysis unit is further configured to:
   generate the alphabet unit input by decomposing the sentence data in the Hanguel alphabet unit,
   index the alphabet unit input and maps the indexed alphabet unit input to number data,
   one-hot encode the number data, and
   generate the embedded sentence data comprising a vector sequence having a continuous characteristic by multiplying a one-hot embedded vector sequence and a sentence embedding matrix.

4. The system of claim 1, wherein the speech reconstruction unit is further configured to:
   generate phase information from the speech feature vector sequence having magnitude information by using a Griffin-lim algorithm, and
   convert the phase information into the speech data.

5. A method for a deep neural network-based non-autoregressive speech synthesis, the method comprising:
   a speech feature vector sequence synthesis step of constructing a non-regressive deep neural network based on multiple decoders and generating a speech feature vector sequence from a template comprising temporal information of speech in stages through the multiple decoders; and
   a speech reconstruction step of converting the speech feature vector sequence into speech data,
   wherein the speech feature vector sequence synthesis step comprises:
   a step of generating an input of the template;
   a speech data encoding step of generating an encoded template by adding a purified sentence data to the input of the template by using attention mechanisms;
   a speech data decoding step of synthesizing a Mel-filterbank speech feature vector sequence by decoding the encoded template; and
   a step of synthesizing a log-power spectrum speech feature vector sequence from the Mel-filterbank speech feature vector sequence, and
   wherein the speech data encoding step comprises steps of, in order to generate the encoded template,
   receiving the purified sentence data and the template as inputs, selecting a portion necessary for log-power spectrum synthesis through the attention mechanisms, and forming a vector having a fixed length,
   estimating a log-power spectrum from the template in stages through the multiple decoders, and
   encoding data of the template comprising accurate information by repeating a convolution network and the attention mechanisms through at least any single decoder of the multiple decoders.

6. The method of claim 5, further comprising a sentence data analysis step of analyzing sentence data and outputting the purified sentence data, wherein the sentence data analysis step comprises steps of:

generating an alphabet unit input by decomposing a sentence data in a Hanguel alphabet unit and forming embedded sentence data having a sentence feature vector sequence form by embedding the alphabet unit input, and forming the purified sentence data by purifying the embedded sentence data by using convolution artificial neural networks.

7. The method of claim 6, wherein the step of forming the embedded sentence data having the sentence feature vector sequence form comprises steps of:

generating the alphabet unit input by decomposing the sentence data in the Hanguel alphabet unit, indexing the alphabet unit input and mapping the indexed alphabet unit input to number data, one-hot encoding the number data, and generating the embedded sentence data comprising a vector sequence having a continuous characteristic by multiplying a one-hot embedded vector sequence and a sentence embedding matrix.

8. The method of claim 5, wherein the template is an input to a speech feature vector sequence synthesis unit, and wherein the template comprises absolute positional encoding data and relative positional encoding data.

9. The method of claim 5, wherein the step of generating the input of the template comprises steps of:

generating absolute positional encoding data;

generating relative positional encoding data; and generating the template by concatenating the generated absolute positional encoding data and the relative positional encoding data.

10. The method of claim 5, wherein the speech data decoding step comprises a step of synthesizing the Mel-filterbank speech feature vector sequence from the encoded template through a speech data decoding artificial neural network.

11. The method of claim 5, wherein the speech reconstruction step comprises generating phase information from the speech feature vector sequence having magnitude information by using a Griffin-lim algorithm, and converting the phase information into the speech data.

* * * * *